(12) United States Patent
Bossert et al.

(10) Patent No.: US 11,384,718 B2
(45) Date of Patent: **\*Jul. 12, 2022**

(54) APPARATUS FOR IMPROVING EFFICIENCY AND EMISSIONS OF COMBUSTION

(71) Applicant: Clack Technologies LLC, Quenomo, KS (US)

(72) Inventors: Marc Allen Bossert, Saint Charles, IL (US); Rance Edd McKenzie, Quenomo, KS (US)

(73) Assignee: Clack Technologies, LLC, Quenomo, KS (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/811,289

(22) Filed: Mar. 6, 2020

(65) Prior Publication Data

US 2021/0277852 A1    Sep. 9, 2021

(51) Int. Cl.
*F02M 27/04* (2006.01)
*F02M 35/10* (2006.01)
(Continued)

(52) U.S. Cl.
CPC ............ *F02M 27/04* (2013.01); *C25B 1/13* (2013.01); *C25B 9/70* (2021.01);
(Continued)

(58) Field of Classification Search
CPC ............ F02M 27/04; F02M 35/02491; F02M 35/10249; C25B 9/70; C25B 1/13; F23L 7/007
(Continued)

(56) References Cited

U.S. PATENT DOCUMENTS 1,873,746 A    8/1932   English
1,982,484 A    11/1934  Runge
(Continued)

FOREIGN PATENT DOCUMENTS

EP    0104739 A1    4/1984
WO    8304243 A1    12/1983
WO    2005069801 A1    9/2005

OTHER PUBLICATIONS

US Products; Oasis-Plus, Information & Operating Instructions; printed from https://www usproducts.com/~/media/WebSites/USProducts-US/PDF/Restoration%20Equipment/Oasis%20Plus/oasis_oppman.ashx, Jan. 22, 2010.

*Primary Examiner* — Yi-Kai Wang
(74) *Attorney, Agent, or Firm* — Bret J. Petersen

(57) ABSTRACT

A robust apparatus to improve the efficiency and emissions of a combustion process using a plurality of cell elements disposed within a housing that is placed in the air intake to a combustion chamber. The ozone cell includes an element assembly where the cell elements are bonded together with two or more mounting rings. The mounting rings incorporate rubber-like mechanical isolation such as an o-ring between the mounting rings and the cell elements. The cell elements may also include rubber-like isolation between the insulating tubes and the outer electrodes. The robust element assembly as described herein is better suited to survive the harsh environment of the ozone cell place in or near a combustion engine or process.

20 Claims, 6 Drawing Sheets

(51) Int. Cl.
  *F23L 7/00*    (2006.01)
  *C25B 1/13*    (2006.01)
  *F02M 35/024*  (2006.01)
  *C25B 9/70*    (2021.01)

(52) U.S. Cl.
  CPC ............... *F02M 35/02491* (2013.01); *F02M 35/10249* (2013.01); *F23L 7/007* (2013.01)

(58) Field of Classification Search
  USPC ........................................................ 123/537
  See application file for complete search history.

(56) References Cited

U.S. PATENT DOCUMENTS

| | | | |
|---|---|---|---|
| 2,960,975 A | 11/1960 | Bergstrom | |
| 4,308,844 A | 1/1982 | Persinger | |
| 4,519,357 A | 5/1985 | McAllister | |
| 4,611,868 A | 9/1986 | Matsui et al. | |
| 5,010,869 A | 4/1991 | Lee | |
| 5,487,874 A | 1/1996 | Gibboney, Jr. | |
| 6,027,701 A * | 2/2000 | Ishioka | C01B 13/11 204/176 |
| 6,167,872 B1 * | 1/2001 | Campagna | F02B 51/04 123/538 |
| 6,463,917 B1 | 10/2002 | Silver | |
| 7,341,049 B2 | 3/2008 | Clack | |
| 7,798,133 B2 | 9/2010 | Clack | |
| 8,028,682 B2 | 10/2011 | Clack | |
| 8,079,347 B2 | 12/2011 | Clack | |
| 8,136,510 B2 | 3/2012 | Clack | |
| 8,240,293 B2 | 8/2012 | Ikeda | |
| 8,485,163 B2 | 7/2013 | Clack | |
| 2005/0016507 A1 | 1/2005 | Tamoi, Sr. | |
| 2005/0126550 A1 | 6/2005 | Varasundharosoth et al. | |
| 2005/0229564 A1 | 10/2005 | Okubo | |
| 2006/0032483 A1 * | 2/2006 | Lu | F02M 27/04 123/536 |
| 2006/0150614 A1 | 7/2006 | Cummings | |
| 2008/0257285 A1 | 8/2008 | Motouchi | |
| 2009/0095266 A1 | 4/2009 | Burmenko | |
| 2009/0133675 A1 * | 5/2009 | Clack | F02M 27/02 123/537 |
| 2009/0229581 A1 | 9/2009 | Ikeda | |
| 2011/0030625 A1 * | 2/2011 | Hammer | F02M 25/12 123/3 |
| 2015/0204281 A1 * | 7/2015 | Clack | F02M 27/02 123/537 |
| 2015/0247246 A1 * | 9/2015 | Katayama | C25B 9/19 204/260 |

* cited by examiner

US 11,384,718 B2

APPARATUS FOR IMPROVING EFFICIENCY AND EMISSIONS OF COMBUSTION

BACKGROUND

1. Technical Field

The disclosure and claims herein generally relate to an apparatus to improve the combustion processes, and more specifically relate to a robust ozone cell for improving the efficiency and emissions of a combustion process and capable of surviving the harsh environment typically found surrounding a combustion engine or combustion process where an ozone cell is placed.

2. Background Art

Introduction of ozone into a combustion chamber has been used to increase the efficiency of the combustion and reduce emissions by increasing the amount of oxygen into the combustion for a given volume of air. Devices to add ozone gas and charged ions to a combustion mixture in an internal combustion engine have been described in the prior art. In some ozone generators, the ozone cell incorporates a single flat plate for the cathode and a single flat plate for the anode, and in others, the ozone cell includes elements with tubular or cylindrical anodes and cathodes. The tubular cells were also shown to be placed with other tubular cells. An electric source is applied between the anode and cathode of the ozone cells. The electric source on the anode and cathode creates an electric field that splits oxygen molecules in the ambient air, leaving two single, highly active atoms of oxygen that combine with other oxygen to produce ozone ($O_3$). Ozone provides 50% more oxygen in its molecule, which can provide faster and more complete combustion.

BRIEF SUMMARY

While the prior are devices to some extent may have accomplished their intended objectives, there is still a need to provide ozone cells that are robust and more able to survive the harsh environment typically found surrounding a combustion engine or combustion process where the ozone cell is placed.

A robust apparatus is described to improve the efficiency and emissions of a combustion process using a plurality of cell elements disposed within a housing that is placed in the air intake to a combustion chamber. The ozone cell includes an element assembly where the cell elements are bonded together with two or more mounting rings. The mounting rings incorporate rubber-like mechanical isolation such as an o-ring between the mounting rings and the cell elements. The cell elements may also include rubber-like isolation between the insulating tubes and the outer electrodes. The robust element assembly as described herein is better suited to survive the harsh environment of the ozone cell place in or near a combustion engine or process.

The apparatus may further include a suspension assembly to moveably support the element assembly within the ozone cell to protect the element assembly from damaging vibration. Other examples of the apparatus may also include a filter screen attached to the ozone cell to reduce large particulate matter from leaving the ozone cell and damaging the combustion chamber.

In another example, each of the plurality of cell elements include an inner electrode and an outer electrode. The inner electrodes are electrically and physically bonded to a bonding ring. The bonding ring with the bonded inner electrodes may then be encased in a potting material to provide a robust element assembly. The opposing end of the element assembly may also be bonded in a potting material.

The foregoing and other features and advantages of the invention will be apparent from the following more particular description and as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The description and claims herein are directed to a robust apparatus to improve the efficiency and emissions of a combustion process using a plurality of cell elements disposed within a housing that is placed in the air intake to a combustion chamber. The ozone cell includes an element assembly where the cell elements are bonded together with two or more mounting rings. The mounting rings incorporate rubber-like mechanical isolation such as an o-ring between the mounting rings and the cell elements. The cell elements may also include rubber-like isolation between the insulating tubes and the outer electrodes. The robust element assembly as described herein is better suited to survive the harsh environment of the ozone cell place in or near a combustion engine or process.

Figure 1:
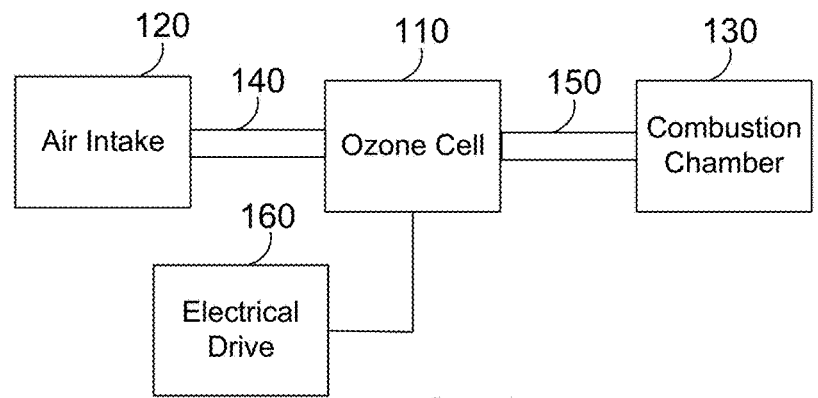
FIG. 1 is a block diagram of an apparatus as described herein for providing ozone to a combustion chamber.

FIG. 1 shows an example of an ozone cell 110 as described herein used to enhance the efficiency of combustion. In FIG. 1, the ozone cell 110 is suitably disposed between the air intake 120 and a combustion chamber 130 to produce ozone and induce a charge in the air supply. Alternatively, the ozone cell is incorporated into the air intake pipe 140 of an existing combustion process setup. The combustion process may be an internal combustion engine such as a diesel truck engine or a gasoline combustion engine such as used in automobiles. Alternatively, the combustion processes could also be combustion processes such as those used for electric power generation, furnaces, water heaters, or virtually any other combustion process. The ozone cell can be mounted in any suitable configuration and could be located at a convenient position which allows the gaseous output to be transmitted to the combustion chamber 130 by a supply line 150. The ozone cell 110 is energized by a suitable electrical drive source 160. The electrical drive source 160 is connected to the inner electrode and outer electrode of the cell elements as described below.

Figure 2:
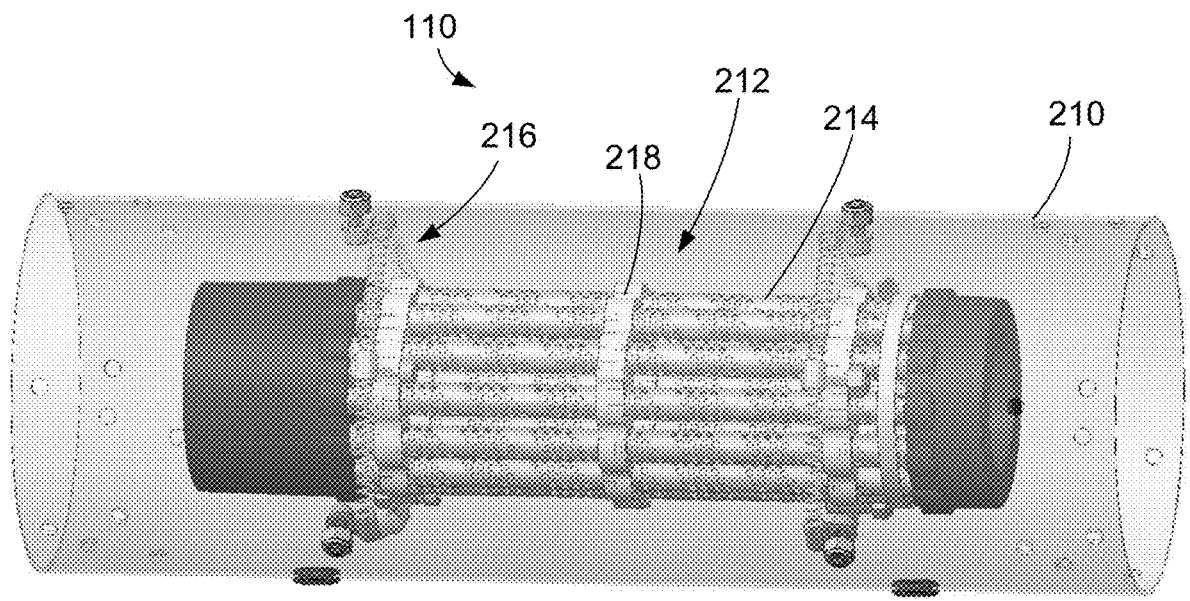
FIG. 2 is perspective view of the ozone cell 110 shown in FIG. 1 for providing ozone to a combustion chamber.

FIG. 2 shows a perspective view of an example ozone cell 110. In this example, the ozone cell 110 includes a cylindrical shaped housing 210. The housing 210 is shown transparent to illustrate the element assembly 212 suspended in the housing 210. The housing 210 that may comprise a pipe made of metal, PVC or similar material. In this example, the housing 210 is sheet metal tube about 5 to 6 inches in diameter. The housing 210 may include a scrubber vortex (not shown) disposed in one or both ends of the housing as known in the prior art. The scrubber vortexes provide air turbulence as to increase the exchange of fresh air at the surface of the ozone cell with the ozone containing air.

FIG. 2 illustrates one specific configuration of an ozone cell 110 with an element assembly 212 which includes an arrangement of multiple cell elements 214. The individual cell elements 214 are described in more detail below with reference to FIGS. 3, 4 and 5. In this example, twelve cell elements 214 are arranged in a circle and connected and bonded together as described below. The cell elements 214 are cylindrical in shape and run nearly the length of the housing 210. The overall length of the cell elements 214 can vary depending on the application.

Again referring to FIG. 2, the element assembly 212 may be suspended in the housing 210 with a suspension assembly 216. The suspension assembly 216 moveably supports the element assembly 212 within the ozone cell 110 to protect the element assembly 212 from damaging vibration that is often found in the harsh environment when the ozone cell 110 is placed in or near a combustion engine or a combustion process. In this example, the suspension assembly 216 includes two spring loops that suspend the element assembly in the housing 210 as further described below with reference to FIG. 10.

Figure 3:
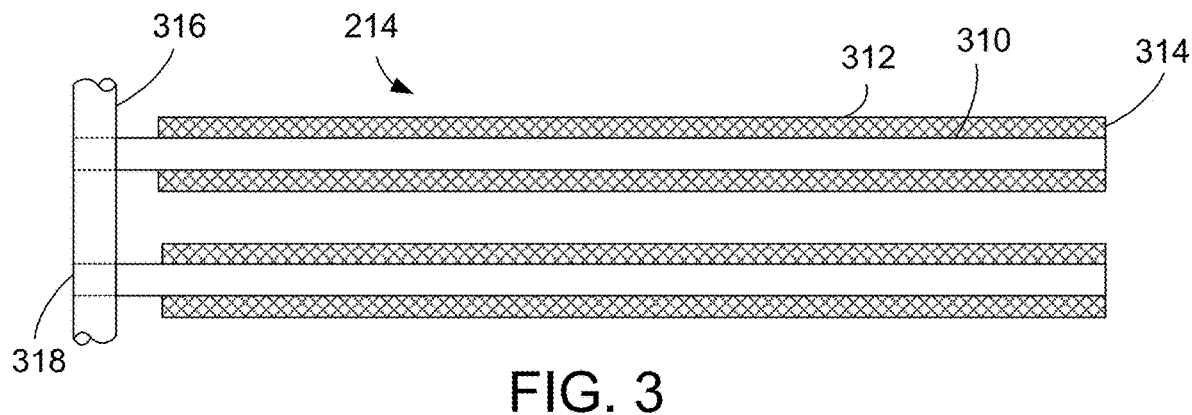
FIG. 3 is a cross-sectional view of a cell element of the element assembly shown in FIG. 2 to illustrate inner electrode connections to a bonding ring.
Figure 4:
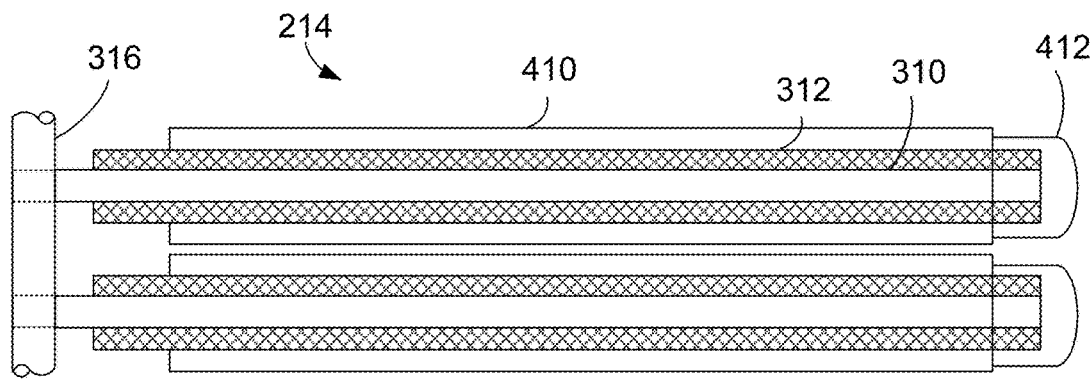
FIG. 4 is a cross-sectional view of the cell element in FIG. 3 with a perforated tube added as the outer electrode to the cell elements.
Figure 5:
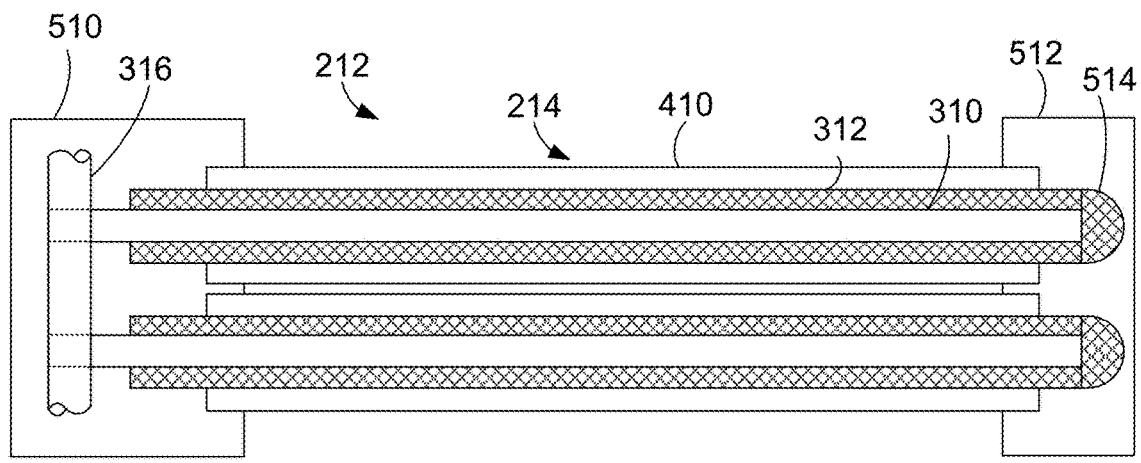
FIG. 5 is a cross-sectional view of the cell elements shown in FIG. 4 with potting material encompassing the ends of the element assembly.

Referring now to FIGS. 3, 4 and 5, additional details of cell element 214 will be described. These figures represent a lateral cross-sectional view of two adjacent cell elements 214 shown in FIG. 2. The cell elements 214 primarily comprise an inner electrode and an outer electrode separated by an insulator. In the example shown in FIG. 3, the inner electrode 310 is the anode and is a conductive tube covered by an insulating tube 312. The inner electrode 310 can be made of a suitable conductive material. In this example, the inner electrode 310 is a tube made of stainless steel. In other examples, the inner electrode or anode could be made of solid metal or other conductive materials. The insulating tube 312 is a suitable material with electrically insulating properties. In this example, the insulating tube 312 is a ceramic tube that fits snugly over the inner electrode 310. The insulating tube 312 is preferably a ceramic material such as glazed or unglazed porcelain. In one example, the insulating tube 312 is made of 99.8% alumina. Other insulators could also be used for the insulating tube 312 such as polyethylene, PVC or other insulators as used in the prior art or developed in the future. The insulating tube 312 may be open ended 314 as shown on in FIG. 3, or be closed at one end 514 as shown in FIG. 5.

Again referring to FIG. 3, one end of the cell elements 214 terminate at a bonding ring 316. The bonding ring 316 ties each of the cell elements together electrically and mechanically. In this example, the bonding ring 316 is a circular shaped metal ring open in the middle. The circular shape of the bonding ring 316 can be seen in FIG. 6 described below. The inner electrodes 310 are electrically and mechanically connected to the bonding ring 316 to provide a common connection of the electrical signal to the inner electrode (anode) of the cell elements 214. In this example, the bonding ring 316 is a ring of stainless steel with holes 318 that accept an end of each of the inner electrodes 310. In the illustrated example the inner electrodes 310 are mechanically pressed into the holes 318 of the bonding ring and soldered into place. Alternatively the inner electrodes 310 could be threaded or welded to the bonding ring 316.

FIG. 4 illustrates the addition of an outer electrode 410 on the insulating tube 312 and the inner electrode 310 shown in FIG. 3. In this example, the outer electrode 410 is a perforated tube made of a conductive material with a pattern of openings in the outer electrode. The openings 610 in the outer electrode 410 can be seen in FIG. 6. The openings 610 in the outer electrode 410 provide air turbulence at the electrode surface to provide additional air contact with the electrode surface to increase the production of ozone and therefore the amount of ozone available to the combustion chamber. The outer electrode can be made of variety of materials. In this example, the electrode is made of stainless steel, but it can also be formed from a variety of materials. The insulator tube 312 may extend beyond the outer electrode 410 a distance sufficient to insure the voltage potential on the electrodes does not cause an arc between the electrodes. In addition, other materials may be added to insulate between the inner electrode 310 and the outer electrode 410. FIG. 4 further illustrates adding end caps 412 to the end of the cell elements opposite the bonding ring 316. The end caps 412 may be made of a suitable insulating material such as ceramic or the other insulating materials described above.

FIG. 5 illustrates the addition of potting material applied over the ends of the cell elements 214 shown in FIG. 4. In this example, potting material 510 is placed over the ends of the cell elements 214 and the bonding ring 316. The potting material 510 serves to mechanically strengthen the element assembly 212 and electrically insulate the inner electrodes 310 and bonding ring 316 from the outer electrode 410. The potting material 510 preferably covers the ends of the cell elements 214 and the bonding ring 316 but is open in the center of the cell assembly 212 to allow air to flow as described below and shown in FIG. 7 and FIG. 12. A suitable potting material may be chosen that can provide the necessary insulation and mechanical properties for the application. In this example, the potting material is an epoxy system with low exothermic properties and electrical properties meeting ASTM D150. Materials suitable for potting electrical devices such as DC stators may also be used. Potting material 512 may also be added to the opposite end of the cell elements 214 away from the bonding ring 316. The potting material 512 may be used with the closed ended 514 insulator tubes 312 as shown. Alternatively, open ended 314 insulator tubes 312 as shown in FIG. 3 may be used with or without end caps 412 shown in FIG. 4.

Figure 6:
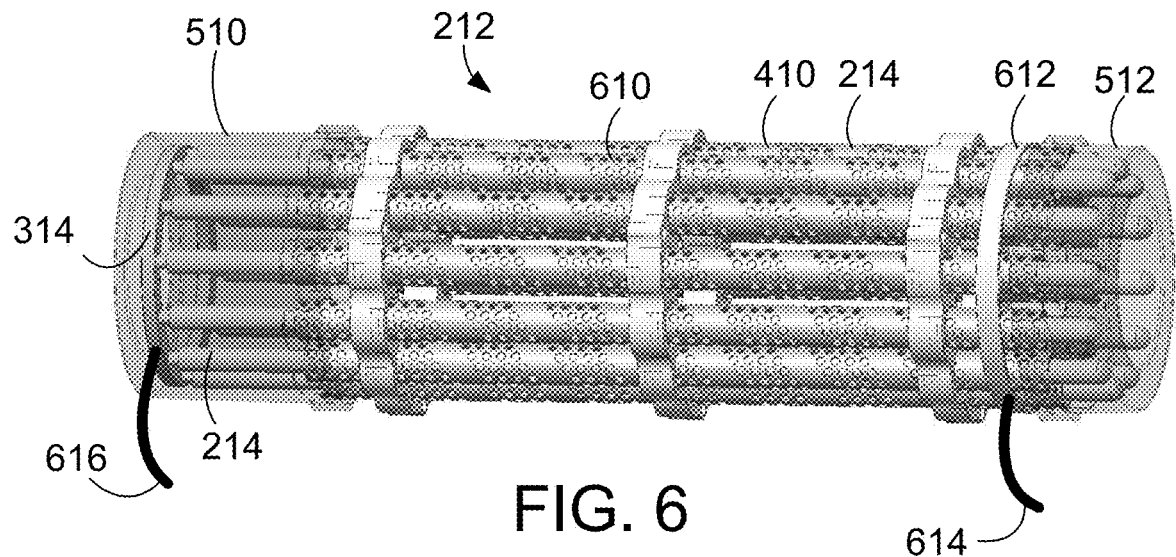
FIG. 6 is a perspective side view of a cell assembly with potting material on both ends.

FIG. 6 is a perspective view of a cell assembly 212 after potting material has been applied. In this example, potting material 510, 512 has been applied on both ends of the element assembly 212. The potting material 510, 512 is shown transparent such that portions of the cell elements 214 and the bonding ring 316 are visible inside the potting material 510. Similarly, the cell elements 214 are also visible inside the potting material 512 at the opposite end. Openings 610 are visible in the outer electrode 410 where the outer electrode 410 is a perforated tube made of a conductive material with a pattern of openings as discussed above.

Figure 12:
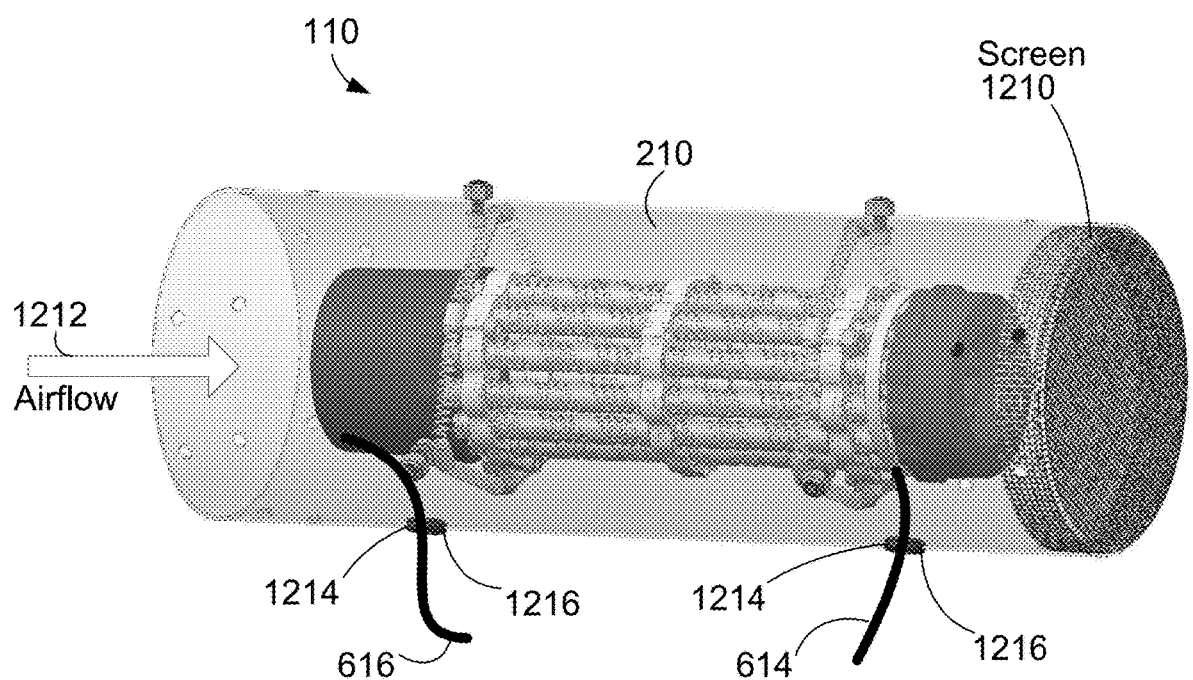
FIG. 12 is a perspective view of an ozone cell that shows airflow through a screen.

FIG. 6 further illustrates electrical connections that are made to the cell elements 214 of the cell assembly 212. A grounding band 612 provides an electrical connection to all the outer electrodes 410 of the cell elements 214. The grounding band 612 is preferably constructed of an electrically conductive metal. Each of the cell element's outer electrodes 410 are welded, soldered, brazed or otherwise electrically connected to the grounding band 612. An electrical connection 614 connects to the grounding band 612. Similarly, an electrical connection 616 connects to the bonding ring 316 inside the potting material 510. The electrical connections 614, 616 extend outside the cell housing 210 as shown in FIG. 12. The electrical drive 160 (FIG. 1) provides the drive voltage to all the cell elements 212 inner electrodes 310 and outer electrodes 410 using the electrical connections 614, 616.

Figure 7:
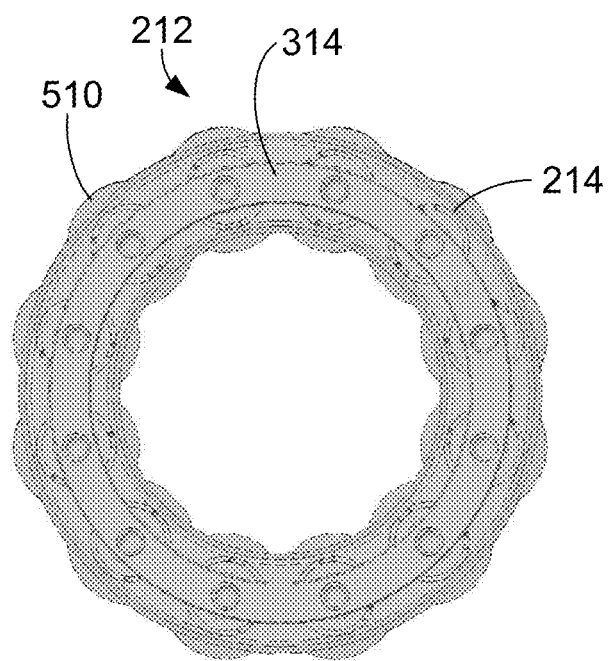
FIG. 7 is an end view of the cell assembly shown in FIG. 6.

FIG. 7 is an end view of the cell assembly 212 shown in FIG. 6. Similar to above, the potting material 510 is shown transparent such that portions of the cell elements 214 and the bonding ring 316 are visible inside the potting material 510. In this view it is clearly shown that the potting material 510 covers the ends of the cell elements 214 and the bonding ring 316 but is open in the center of the cell assembly 212 to allow air to flow as described below with reference to FIG. 12.

Figure 8:
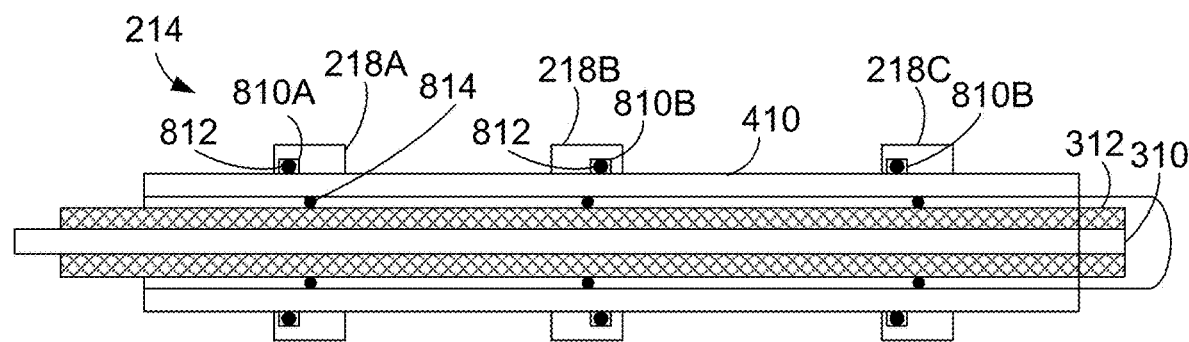
FIG. 8 is a cross-sectional view of a cell element with mounting rings.

FIG. 8 is a cross-section view of a cell element 214 with a portion of the mounting rings 218 visible to show another example of a robust element assembly 212 with additional features for surviving in a harsh environment. In this example, the cell elements 214 are bonded together with three mounting rings 218A, 218B and 218C (collectively referred to as mounting rings 218). The mounting rings 218 are also visible in FIG. 2. In FIG. 8, only the portion of the mounting rings 218 surrounding the cross-section of one cell element 214 is shown. The mounting rings 218 incorporate mechanical isolation between the mounting rings and the cell elements to provide additional durability for the cell assembly 212. In this example, the isolation is provided by o-rings 812 placed within channels 810A, 810B, 810C (collectively referred to as channels 810) in the mounting rings 218. The channels 810 are offset in consecutive openings in a mounting ring 218 where there is not sufficient room for the channels to be in the same plane. For example, channel 810A is shown located to the left side in the mounting ring 218. In contrast, channel 810B is shown located to the right side in its mounting ring 218B. The offset of the channels is further illustrated in FIGS. 9 and 10 discussed below.

Again referring to FIG. 8, the cell elements may also include rubber-like, physical isolation between the outer electrode 410 and the insulating tube 312. In this example, the outer electrode 410 has a larger inner diameter than the outer diameter of the insulating tube 312. Further, in this example, the physical isolation is provided by placing a plurality of o-rings 814 placed over the insulating tube before sliding the outer electrode 410 over the insulating tube. In this example, the o-rings 814 are fluoropolymer elastomer (synthetic rubber) such as Viton™ made by Chemours. Other rubber-like compounds could be employed to provide the physical isolation. For example, rubber-like material could be placed on either the insulating tube 312 or the outer electrode 410.

Figure 9:
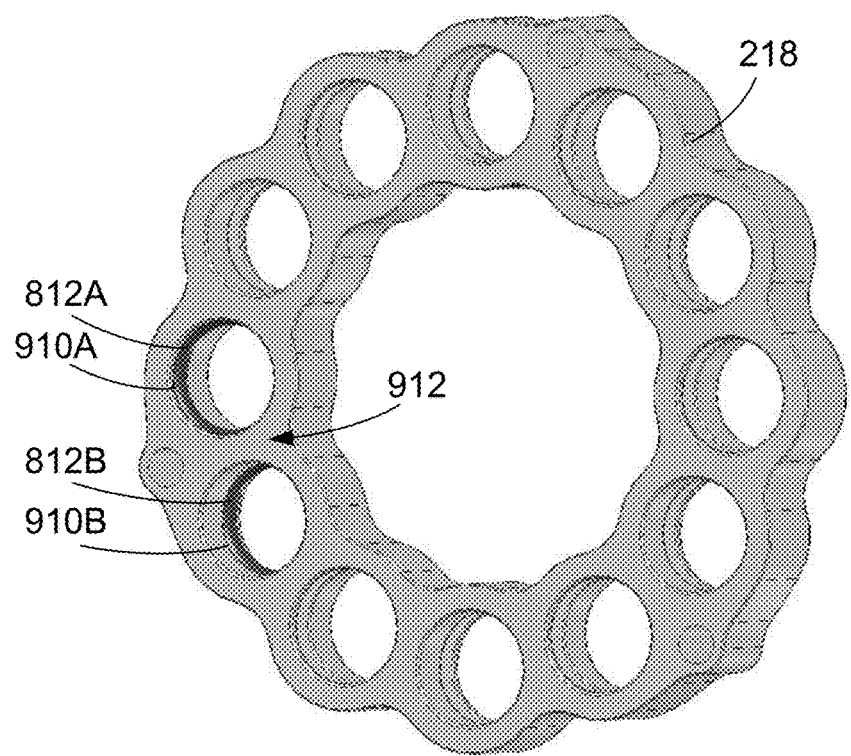
FIG. 9 is a perspective view of a mounting ring to illustrate o-rings installed in channels of the mounting ring.

FIG. 9 is a perspective view of a mounting ring 218. The mounting ring 218 incorporates isolation between the mounting rings and the cell elements as discussed above. In the illustrated example, the isolation is provided by o-rings placed within channels in the mounting ring 218 as discussed above. FIG. 9 illustrates o-rings 812A, 812B installed in channels 910A, 910B of the mounting ring 218. The channels 910A, 910B are offset in consecutive openings in the mounting ring because there is not sufficient room between the channels as shown at 912. The other channels in mounting ring 218 are shown without o-rings. The offset between channels of consecutive mounting ring openings is also shown in FIG. 8 and FIG. 10.

Figure 10:
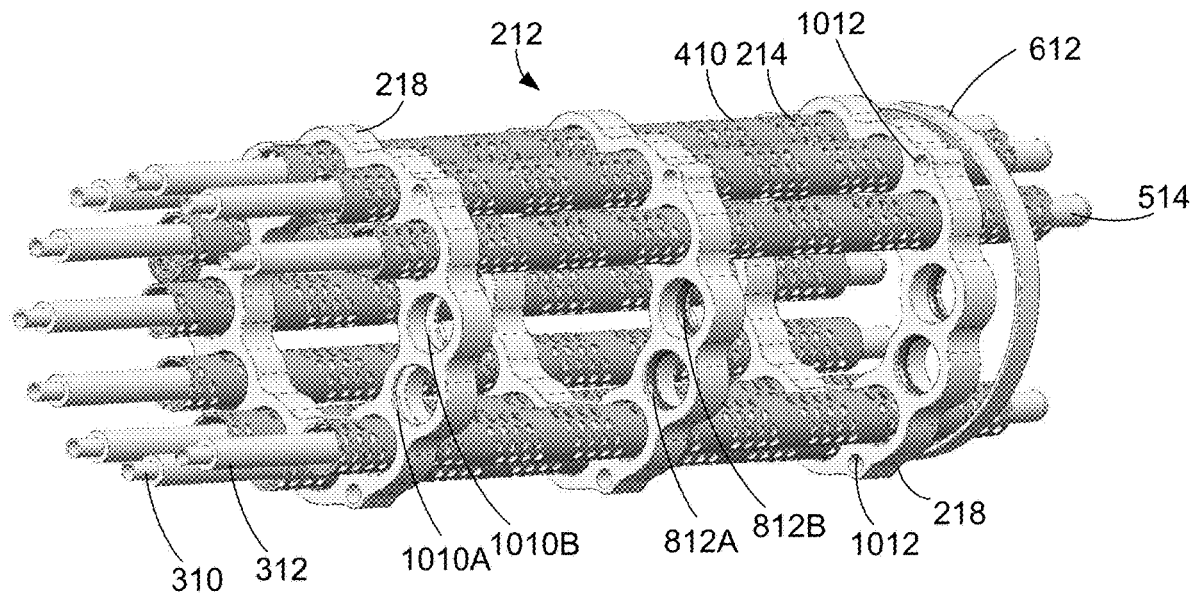
FIG. 10 is a partial perspective view of a cell assembly.
Figure 11:
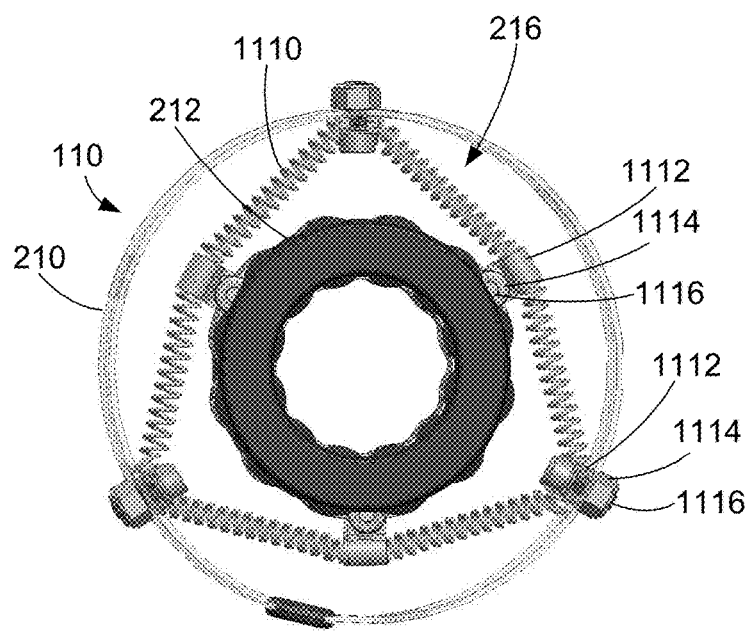
FIG. 11 is an end view of an open ozone cell showing the element assembly suspended by the suspension assembly.

FIG. 10 is a partial perspective view of an element assembly 212 to further illustrate details of the element assembly 212. The grounding band 612 can be seen that provides an electrical connection to all the outer electrodes 410 of the cell elements 214 as introduced in FIG. 6. FIG. 10 further shows the locations of the o-rings 812A, 812B installed in channels of the mounting ring 218. The channels 1010A, 1010B are shown without o-rings offset in consecutive openings in the mounting ring 218. Mounting holes 1012 in the mounting rings 218 are used to mount and suspend the element assembly 212 in the ozone cell as shown in FIG. 11. In this example, the cell elements 214 include closed ends 514 on the insulating tubes 312 as described above.

FIG. 11 is an end view of an open ozone cell 110 illustrating the element assembly 212 suspended within the housing 210 of the ozone cell 110 by the suspension assembly 216. The suspension assembly 216 moveably supports the element assembly 212 within the ozone cell 110 to protect the element assembly 212 from damaging vibration found in many harsh environments where the ozone cell may be deployed. In this example, the suspension assembly 216 comprises a spring 1110 that is attached to the housing 210 at three locations with a spring clamp 1112. The spring clamp 1112 is attached to the housing 210 with a bolt 1114 and nut 1116. The spring 1110 is further attached to the element assembly 212 at three locations between the locations where the spring 1110 is attached to the housing 210. The spring 1110 is attached to the mounting rings 218 using the mounting holes 1012 introduced above. The spring 1110 is attached to the element assembly 212 at the mounting holes 1012 with spring clamps 1112 with bolts 1114 and nuts 1116. In this example, the spring 1110 is a single continuous loop spring. In this example, the loop spring has alternating attachments to the mounting rings of the element assembly and the housing. Alternatively, separate springs could be used between the housing 210 and the element assembly 212 to suspend the element assembly 212 within the housing 210.

FIG. 12 is a perspective view of an ozone cell that shows airflow through a filter for protection of the ozone cell. In this example, the filter is a screen 1210 attached to the ozone cell to prevent debris created by a damaged cell from entering and damaging the combustion chamber 130 (FIG. 1). In this example, the screen 1210 is fitted to the housing 210 to cover one end of the ozone cell 110. The screen 1210 filters the air as it leaves the ozone cell 110 shown by the airflow 1212. The screen 1210 may be made of any suitable material that can withstand the environment of the application where the ozone cell 110 is to be deployed. In this example, the screen 1210 is made of a metal wire mesh. The opening size of the screen 1210 should be small enough to filter out unwanted debris from the ozone cell 110. In this example, the screen 1210 is made of 25 gage stainless steel mesh of 10×10 wires per linear inch.

FIG. 12 further illustrates electrical connections to the ozone cell 110. Electrical connections to cell elements were described above with reference to FIG. 10 where connections were made to the bonding ring and the grounding band that connected the inner electrodes and outer electrodes respectively. These electrical connections may extend outside the housing 210 of the ozone cell 110. In the illustrated example, the electrical connections 614, 616 extend through openings 1214 in the housing 210 with grommets 1216 fitted to openings 1214 of the housing 210 to protect the electrical connections 614, 618.

In the illustrated examples, the ozone cell has twelve cell elements 214 arranged in a concentric circle pattern inside the ozone cell 110. The number of cell elements can vary depending on the specific application and the size of the ozone cell housing. The pattern of cell elements allows for the formation of a plasma field around each of the cell elements and between the cell elements.

The disclosure and claims herein are directed to an apparatus that provides significant improvements over the prior art. An apparatus was described that increases durability and longevity of an ozone cell subject to a harsh environment typical of many combustion processes.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. An apparatus for increasing the efficiency of combustion
comprising:
an element assembly disposed in a housing;
a plurality of cylindrical cell elements arranged adjacent to one another in the element assembly wherein the cell elements each comprise:
a cylindrically shaped outer electrode of conductive material;
a cylindrically shaped inner electrode of conductive material disposed inside the outer electrode;
a cylindrically shaped insulator between the inner electrode and outer electrode;
a plurality of mounting rings connected to the cylindrically shaped outer electrodes that mechanically bond the cell elements together in the element assembly;
wherein the plurality of mounting rings comprise a plurality of openings, with an opening for each of the plurality of cell elements; and
wherein the plurality of mounting rings retain the plurality of cell elements placed in the plurality of openings and include mechanical isolation between the plurality of mounting rings and the plurality of cell elements.

2. The apparatus of claim 1 further comprising a plurality of o-rings disposed in channels in the plurality of openings in the plurality of mounting rings and that contact the cylindrically shaped outer electrodes of the plurality of cell elements to provide the mechanical isolation.

3. The apparatus of claim 1 further comprising a conductive bonding ring mechanically and electrically bonded to an end of each cylindrically shaped inner electrode of the plurality of cylindrical cell elements.

4. The apparatus of claim 3 wherein the conductive bonding ring is a circular shaped metal ring with a plurality of holes with a hole for each cell element, and wherein each cylindrically shaped inner electrode is pressed and soldered into a respective hole of the plurality of holes.

5. The apparatus of claim 4 further comprising potting material covering the bonding ring and the inner electrodes of the plurality of cell elements with an opening in the potting material that allows air flow between the plurality of cell elements.

6. The apparatus of claim 3 further comprising potting material covering an end of the element assembly opposite the bonding ring with an opening in the potting material that allows air flow between the plurality of cell elements.

7. The apparatus of claim 1 further comprising a suspension assembly that moveably supports and suspends the element assembly within the housing.

8. The apparatus of claim 7 wherein the suspension assembly comprises a loop spring alternating attachment to the element assembly and the housing.

9. The apparatus of claim 1 further comprising a plurality of o-rings disposed between the cylindrically shaped insulator and the cylindrically shaped outer electrode of the plurality of cell elements.

10. The apparatus of claim 1 further comprising a screen fitted over an end of the housing that filters air as it leaves the housing of the ozone cell.

11. The apparatus of claim 1 wherein the cylindrically shaped insulator is closed on one end.

12. An apparatus for increasing the efficiency of combustion
comprising:
an element assembly disposed in a housing;
a plurality of cylindrical cell elements arranged adjacent to one another in the element assembly wherein the cell elements each comprise:
a cylindrically shaped outer electrode of conductive material;
a cylindrically shaped inner electrode of conductive material disposed inside the outer electrode;
a cylindrically shaped insulator between the inner electrode and outer electrode; and
a plurality of mounting rings connected to the cylindrically shaped outer electrodes that mechanically bond the cell elements together in the element assembly, wherein the plurality of mounting rings comprise a plurality of openings, with an opening for each of the plurality of cell elements, wherein the plurality of mounting rings retain the plurality of cell elements placed in the plurality of openings and include mechanical isolation between the plurality of mounting rings and the plurality of cell elements; and
a plurality of o-rings disposed in channels in the plurality of openings in the mounting rings that contact the cylindrically shaped outer electrodes of the plurality of cell elements to provide the mechanical isolation.

13. The apparatus of claim 12 further comprising a conductive bonding ring mechanically and electrically bonded to an end of each cylindrically shaped inner electrode of the plurality of cylindrical cell elements, wherein the conductive bonding ring is a circular shaped metal ring with a plurality of holes with a hole for each cell element, and wherein each cylindrically shaped inner electrode is pressed and soldered into a respective hole of the plurality of holes.

14. The apparatus of claim 13 further comprising potting material covering the bonding ring and the inner electrodes of the plurality of cell elements with an opening in the potting material that allows air flow between the plurality of cell elements.

15. The apparatus of claim 13 further comprising potting material covering an end of the element assembly opposite the bonding ring with an opening in the potting material that allows air flow between the plurality of cell elements.

16. The apparatus of claim 12 further comprising a suspension assembly that moveably supports and suspends the element assembly within the housing wherein the suspension assembly comprises a loop spring alternating attachment to the element assembly and the housing.

17. The apparatus of claim 12 further comprising a plurality of o-rings disposed between the cylindrically shaped insulator and the cylindrically shaped outer electrode of the plurality of cell elements.

18. The apparatus of claim 12 further comprising a screen fitted over an end of the housing that filters air as it leaves the housing of the ozone cell.

19. The apparatus of claim 12 wherein the cylindrically shaped insulator is closed on one end.

20. An apparatus for increasing the efficiency of combustion comprising:
- an element assembly disposed in a housing;
- a plurality of cylindrical cell elements arranged adjacent to one another in the element assembly;
- wherein the cell elements each comprise:
    - a cylindrically shaped outer electrode of conductive material perforated with a pattern of holes;
    - a cylindrically shaped inner electrode of conductive material disposed inside the outer electrode;
    - a cylindrically shaped insulator between the inner electrode and outer electrode wherein the cylindrically shaped insulator is closed on one end;
- a plurality of mounting rings connected to the cylindrically shaped outer electrodes that mechanically bond the cell elements together in the element assembly; wherein the plurality of mounting rings comprise a plurality of openings, with an opening for each of the plurality of cell elements; and wherein the plurality of mounting rings retain the cell elements placed in the plurality of opening and include mechanical isolation between the plurality of mounting rings and the plurality of cell elements;
- a conductive bonding ring mechanically and electrically bonded to and end of each cylindrically shaped inner electrode of the plurality of cylindrical cell elements, wherein the conductive bonding ring is a circular shaped metal ring with a plurality of holes with a hole for each cell element, and wherein each cylindrically shaped inner electrode is pressed and soldered into a respective hole of the plurality of holes;
- potting material covering the bonding ring and the inner electrodes of the plurality of cell elements with an opening in the potting material that allows air flow between the plurality of cell elements; and
- potting material covering an end of the element assembly opposite the bonding ring with an opening in the potting material that allows air flow between the plurality of cell elements.

* * * * *